June 18, 1935.  F. G. DENNISON  2,005,181
HOBBYHORSE
Filed April 7, 1932   2 Sheets-Sheet 1
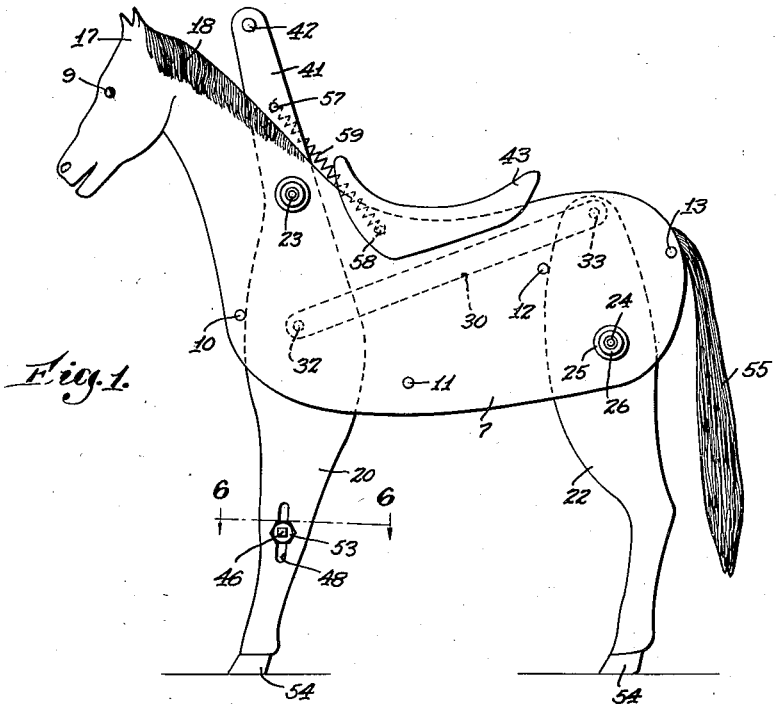
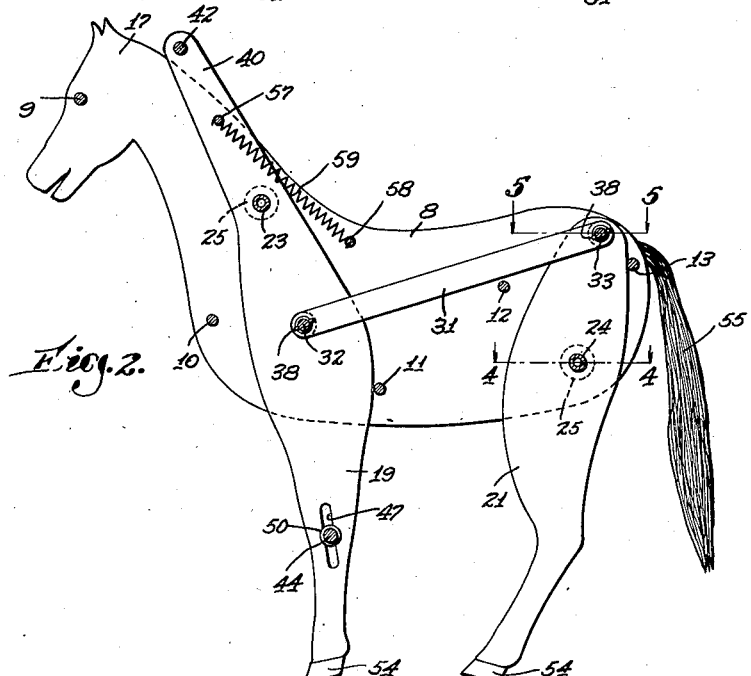

June 18, 1935.  F. G. DENNISON  2,005,181
HOBBYHORSE
Filed April 7, 1932  2 Sheets-Sheet 2
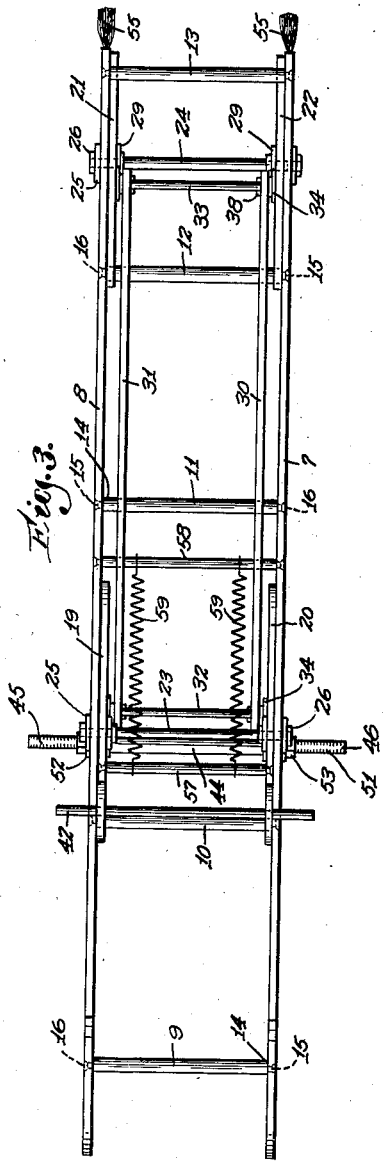
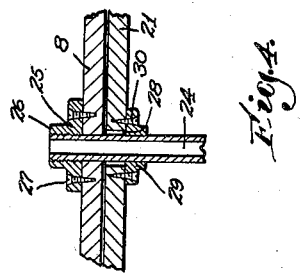
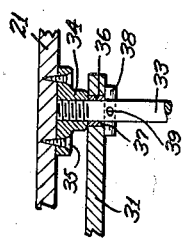
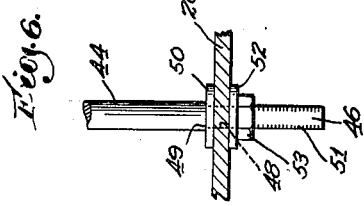

Patented June 18, 1935

2,005,181

UNITED STATES PATENT OFFICE 2,005,181

HOBBYHORSE

Frank G. Dennison, Newton, Mass.

Application April 7, 1932, Serial No. 603,819

5 Claims. (Cl. 272—53)

The present invention relates to hobby-horses, and particularly to hobby-horses capable of movement over the ground.

It has been proposed heretofore to produce progressing hobby-horses, but the constructions so far devised have all had inherent the disadvantage of failing to simulate the movement of a horse. Operating by means of rollers or rockers, or with dragging hind legs, none of them has achieved the action of the horse it represents.

Accordingly, it is the principal object of the present invention to produce a progressing hobby-horse which simulates the action of a horse.

To the accomplishment of this object and such others as may hereinafter appear, the various features of the present invention reside in certain constructions, combinations, and arrangements of parts hereinafter described and then set forth in the appended claims which possess advantages readily apparent to those skilled in the art.

The various features of the present invention will be understood readily from an inspection of the accompanying drawings illustrating the best form of the invention at present devised, in which, Figure 1 is a view in left side elevation of the hobby-horse;

Fig. 2 is a view in longitudinal sectional elevation;

Fig. 3 is a view in plan of the hobby-horse with the saddle removed;

Fig. 4 is a detail view in sectional plan taken on the line 4—4 of Fig. 2;

Fig. 5 is a detail view in sectional plan taken on the line 5—5 of Fig. 2, and

Fig. 6 is a detail view in sectional plan taken on the line 6—6 of Fig. 1.

In the illustrated embodiment of the present invention, the hobby-horse is provided with a body portion composed of two side members 7 and 8 (Fig. 3), which may be made of wood, three-ply wood furnishing adequate strength, and cut to represent the general shape of a horse's head and body, (Figs. 1 and 2). The side members 7 and 8 are spaced apart to form a rigid frame by means of cross bars 9, 10, 11, 12 and 13. Inasmuch as the cross bars 10, 11, 12, and 13 also serve as stops limiting the movement of the legs, as will be explained hereinafter, it is preferable that they be made of metal. The cross bars are provided with shoulders 14 formed by reduced portions 15 at each extremity. The side members 7 and 8 are provided with countersunk holes 16 in which the reduced end portions 15 are fitted and then upset. The cross bar 9 is fitted into the head 17 so that the ends fitting in the holes 16 may form eyes. A mane 18 is also painted on the side members 7 and 8.

The hobby-horse is provided with right and left fore legs 19 and 20, respectively, and right and left hind legs 21 and 22, respectively. The fore legs are pivoted inside the side members 7 and 8 on a rod 23, the ends of which connect the side members 7 and 8. The hind legs are pivoted inside the side members 7 and 8 on a rod 24, the ends of which also connect the side members 7 and 8. As shown in Figs. 1 and 2 the fore legs are pivoted to the upper portion of the body frame just below the base of the neck, while the hind legs are pivoted to the body portion at their lower thigh portions.

The details of construction whereby the legs are pivoted to the body frame are shown in Figs. 3 and 4. Inasmuch as the means for pivoting the fore legs 19 and 20 on the rod 23 and for pivoting the hind legs 21 and 22 on the rod 24 are identical, it is deemed sufficient to show the details of only one pivoting, that of the right hind leg 21 as shown in Fig. 4.

To this end the rod 24, preferably of metal tubing, is externally threaded, and passes through a hole drilled in the side member 8 to fit a flange 25 on the outer face of the side member 8. The flange 25 is provided with an integral boss 26. As shown in Fig. 4 the end of the shaft 24 fits flush with the end of the boss 26. The flange 25 is secured to the side member 8, by means of screws 27. The rod 24 also passes through the pivot hole 28 of the leg 21. Forming a bearing for the leg 21 upon the rod 24 is an internally smooth, bossed flange 29, which is secured to the leg 21 by means of screws 30. It will be seen in Fig. 4 that the pivot hole 28 of the leg 21 has a diameter greater than the internal diameter of the flange 29 to the end that the leg may not contact the rod 24 and thus be subjected to wear.

In terms of mechanics, the embodiment of the present invention comprises a four bar linkage lever system, the paired fore legs 19 and 20 constituting one lever and the paired hind legs 21 and 22 constituting the other lever. The body frame constitutes one link of the system, and to complete the linkage, the left fore and hind legs are connected pivotally by means of a link 30, while the right fore and hind legs are connected pivotally by means of a link 31. The forward ends of the links 30 and 31 are pivoted on an end threaded rod 32, while the rearward ends of the links 30 and 31 are pivoted on an end threaded rod 33. As the method of pivoting is identical for all four link ends, only one will be desribed, that for pivoting the link 31 to the right hind leg 21, as shown in Fig. 5.

To this end the leg 21 is provided on its inner face with an internally threaded bossed flange 34 secured thereto by means of screws 35. Fitted into the flange 34 and abutting the inner face of the leg 21 is the rod 33. The end of the link 31 is provided with a pivot hole 36 in which is inserted a bushing 37 to form a bearing for the link 31 on the rod 33. The link 31 is held adjacent the flange 34 by means of a cross pin 38 secured to the rod 33 by means of a set screw 39.

As shown in Figs. 1 and 2 the forward ends of the links 30 and 31 are pivoted to the fore legs at a point below the rod 23, and the rearward ends of the links 30 and 31 are pivoted to the hind legs at a point above the rod 24.

It has been pointed out that the cross bars 10, 11, 12, and 13 also serve as stops, limiting the movement of the legs. As shown in Fig. 1 the cross bars 10 and 12 limit the movement of the fore and hind legs, respectively, in one position during operation, while, as shown in Fig. 2, the cross bars 11 and 13 limit the movement of the fore and hind legs, respectively, in an opposite position during operation. The stops, of course, are a necessary element in the pivoted construction shown, for without a limiting of the movement of the legs no stability could be achieved.

To aid in operating the lever constituted by the pivoted fore legs 19 and 20, they are provided with integral extensions 40 and 41, respectively, projecting above the side members 7 and 8. The ends of the extensions 40 and 41 are drilled to allow the passage therethrough of a horizontal handle bar 42. As shown in Fig. 3, preferably the handle bar 42 extends exteriorly of the extensions 40 and 41, but such construction is not essential.

The fore legs 19 and 20 are provided (Fig. 3) with foot rests 45 and 46, respectively, which may be adjusted to adapt them to the length of the legs of the rider. To this end the fore legs 19 and 20 are provided with slots 47 and 48, respectively, through which pass the reduced ends 45 and 46 of a rod 44, the squared ends forming the foot rests. As shown in Fig. 6, shoulders 49 formed on the rod 44 by the reduced end portions abut a washer 50 which in turn abuts the leg 20 interiorly thereof. The foot rests, being squared, are threaded along their edges as shown at 51. A washer 52 abuts the leg 20 exteriorly, and the nut 53 is threaded on the foot rest 46 to hold the parts rigidly. The construction for securing the foot rest 45 to the leg 19 is identical. In this way a firm support is afforded the rider's feet, and the fore legs are braced, yet the supports can be adjusted vertically.

The present invention is provided with a saddle 43 which may be of wood or any suitable construction. The legs are provided with rubber hoofs 54 which absorb any shock, and the body portion is provided with tail members 55. The extensions 40 and 41 carry a cross bar 57, and the side members 7 and 8 carry another cross bar 58. As best shown in Fig. 3, springs 59 connect the cross bars 57 and 58 on either side of the body of the hobby-horse. As the springs 59 play an important part in the operation of the present invention, the cross bars 57 and 58 should be so positioned that the springs do not buckle on the saddle 43.

Viewing Fig. 3, it is clear that the elements so far described constitute a stable mechanism. The side members 7 and 8 are held spaced apart by the cross bars 9, 10, 11, 12, and 13. The links 30 and 31 are held spaced apart on the rods 32 and 33 by means of the cross pins 38. Positioned between the side frames 7 and 8 and the links 30 and 31, respectively, are the legs, and the spacing of the links 30 and 31 from the side frames 7 and 8, respectively, prevents side play by the legs. The fore legs are given further stability by the spacing afforded by the handle bar 42 and the shouldered foot rest rod 44, and the cross bars 10, 11, 12, and 13, besides bracing the body portion, limit the movement of the legs, thereby enabling the hobby-horse to stand and be ridden.

In the operation of the hobby-horse, the rider mounts the saddle 43, places his feet on the foot rests 45 and 46, and grasps the handle bar 42. Let it be assumed that when a mounting is made, the hobby-horse is in the position shown in Fig. 1. The rider's first object is to take his weight from the rear legs so that they may be lifted from the ground. To accomplish this, the rider thrusts his body forward so that his weight is borne by the foot rests 45 and 46. As a result of this forward thrust, the fore legs 19 and 20 are tilted forward, rocking on the hoofs and finally assuming the position shown in Fig. 2. This action causes a stretching of the springs 59 because they are secured to the cross bar 58, and this stretching serves to lift the hind quarters from the ground since the rider's weight no longer holds them down.

The extent to which the rider thrusts his body forward depends, of course, upon the rider's size and weight. That is, the rider must not lean so far forward as to cause the horse to topple over. As in learning to ride a bicycle, the rider must learn by experiment what body movements the construction will allow before equilibrium is lost.

Since the fore legs 19 and 20 rock on the hoofs and are tilted forward when the rider thrusts his body forward, the body portion of the hobby-horse is thereby swung relatively to the fore legs on the rod 23 as shown in Fig. 2, the action carrying the rod 32 rearward of the rod 23. This movement of the rod 32 causes the hind legs 21 and 22, by means of the links 30 and 31, to be swung simultaneously and positively on the rod 24 in a direction opposite to that of the fore legs 19 and 20. The movement of the legs is limited by the cross bars 11 and 13. It is to be noted that the springs 59 do not serve to move the hind legs 21 and 22, as the links 30 and 31 entirely control such movement. The springs 59 merely facilitate the action of the links.

It has been pointed out that when the rider thrusts his body forward, the springs 59 lift the hind quarters from the ground. It is clear, however, since this forward thrust is not so great as to cause the horse and rider to topple over, that when the force of the thrust is spent, the hind legs must drop in contact with the ground. This dropping occurs at the end of the forward movement of the rider's body, and at this moment the hobby-horse assumes the position shown in Fig. 2. When this position is reached, the rider then thrusts his body rearward, resting it almost entirely upon the hind legs, inertia thereby taking the fore legs off the ground as the hind legs rock on the hoofs. At the same time the rider both pulls rearwardly on the handle bar 42 and pushes forwardly with his feet on the foot rests 45 and 46. This combined movement causes the fore legs 19 and 20 to swing forward on the rod 23, and this movement necessarily brings forward the rod 32 carrying the forward ends of the links 30 and 31. The rod 33, carrying the rear ends of the links 30 and 31, is thereby drawn forward positively. This action serves to swing the hind legs upon the rod 24, which action, because the fore legs are out of contact with the ground, serves to drive the hobby-horse forward the extent of one pace, and when the force of the inertia raising the fore legs has been spent, the fore legs again contact the ground, thereby completing the pace.

As is the case when the rider leans forward, the rearward movement of the rider's body must not be so great as to cause both hobby-horse and rider to lose their equilibrium.

As the fore legs again make ground contact, the rider thrusts his body forward so that he once more supports his weight on the foot rests 45 and 46. This forward movement causes a combined movement of the fore legs and of the body portion relative to them, so that the hind legs are prepared for the next forward pace, and the cycle of movement is recommenced. In this way, by the rider thrusting his body forward and rearward alternately, the hobby-horse can be made to travel over the ground.

A pace of about two feet can be achieved in a construction built for children of the ages from seven to twelve. The length of the pace may be varied by the rider, however, by not moving the handle bar 42 the full distance permitted by the stops 10, 11, 12, and 13.

It has been pointed out that the structure described constitutes mechanically a four bar linkage lever system, the fore legs 19 and 20 being one lever, and the hind legs 21 and 22 being the other. The links 30 and 31, operating in unison, form one link of the system, and the body portion, because it is pivoted to the legs, forms the other link of the system. The elements of this system are well illustrated in Figs. 1 and 2, showing the leg pivot rods 23 and 24 positioned above and below the link pivot rods 32 and 33, respectively. With such a construction, and with the cross bars 10, 11, 12, and 13 cooperating therewith as stops, the links 30 and 31 are never in a position parallel with the plane of the hoofs so as to come to a dead center rendering the hobby-horse inoperative. Stated in another way, the link pivot rods 32 and 33 are never equally distant from the plane of the hoofs in the operation of the hobby-horse, nor are the leg pivot rods 23 and 24 ever equally distant from the plane of the hoofs.

It will be seen from Fig. 1 that as the rider throws his body forward and the hind legs are taken off the ground, the fore legs 19 and 20 constitute a lever of the second class. That is to say, the fulcrum is at the point of contact of the hoofs with the ground, the power application point is at the handlebar 42, and the resistance is at the pivot rods 23 and 32. At the same time, the hind legs 21 and 22 constitute a lever of the first class, the fulcrum being the pivot rod 24, the power application point being at the pivot rod 33, and the resistance being the weight of the hind legs. Conversely when the rider throws his body rearward and pulls rearwardly on the handlebar 42, the hind legs 21 and 22 constitute a lever of the second class, the fulcrum being at the point where the hoofs contact the ground, the power application point being at the pivot rod 33, and the resistance being at the pivot rod 24. At the same time the fore legs, being off the ground, constitute a lever of the first class, the fulcrum being the pivot rod 23, the power application point being the handlebar 42, and the resistance being the weight of the fore legs and the pull on the pivot rod 32.

It will also be seen from Fig. 1 that the pivot rod 33 is forward of the pivot rod 24 at the end of the rearward movement of the rider's body, and from Fig. 2 that the pivot rod 33 is rearward of the pivot rod 24 at the beginning of the rearward movement of the rider's body.

The present invention has been described herein as being provided with two body members spaced apart by cross bars. While such a construction is well adapted for a child's hobby-horse, it is clear that the lever principle upon which the present invention operates is not dependent upon such a framework. The described pivoting of the legs and links and their mode of operation may be achieved as well in an enclosed body with a single head member as in a body frame of the nature described. Further, it is not necessary that two links be used either in an enclosed body or in one of the nature described, since one link connected to the fore and hind legs could be substituted for the two links disclosed which act as a unit. Neither is it necessary that the pivot rods be positioned relatively to each other in the precise manner described, since a different relationship would not change the lever principle nor in any way affect the simultaneous movement of the legs. It will also be clear to those skilled in the art, and with the general objects of the present invention in view, that other changes may be made in the details of structure, the described and illustrated embodiment thereof being intended as an exploitation of the underlying essentials of the present invention, the features of which are definitely stated in their true scope in the claims presented herewith.

What is claimed as new, is:

1. In a hobby-horse capable of forward movement, the combination with a body portion and fore and hind legs carried thereby and connected together for movement simultaneously in opposite directions as the rider thrusts his body forward or rearward, said fore legs being provided with extensions connected together to form a hand lever for the rider, of a resilient connection between the hand lever and the body portion for facilitating the movement of the hind legs as the rider thrusts his body forward.

2. A hobby-horse capable of forward movement having, in combination, a body portion, fore and hind legs pivoted thereto and linked together on each side of the body portion, respectively, for simultaneous movement in opposite directions, the fore legs being pivoted to the body portion above the link connections with the fore legs, the hind legs being pivoted to the body portion below the link connections with the hind legs, and the fore legs being provided with extensions connected together to form a hand lever for the rider, and a resilient connection between the hand lever and the body portion.

3. A hobby-horse capable of forward movement having, in combination, a body portion, and fore and hind legs pivoted thereto and linked together on each side of the body portion, respectively, for simultaneous movement in opposite directions, the fore legs being pivoted to the body portion above the link connections with the fore legs, the hind legs being pivoted to the body portion below the link connections with the hind legs, and the fore legs being provided with extensions connected together to form a hand lever for the rider, a resilient connection between the hand lever and the body portion, and ground engaging hoof portions bodily secured to the legs.

4. A hobby-horse capable of forward movement having, in combination, a body portion, fore and hind legs carried thereby and linked together on each side of the body portion, respectively, said fore legs being provided with extensions connected together to form a hand lever for the rider, a resilient connection between the hand lever and the body portion, and ground engaging hoof portions bodily secured to the legs.

5. In a hobby-horse capable of forward movement, the combination with a body portion, fore and hind legs pivoted thereto, and links connecting the fore and hind legs on each side of the body portion, respectively, said fore legs being provided with extensions connected together to form a hand lever for the rider, of a resilient connection between the hand lever and the body portion.

FRANK G. DENNISON.